Feb. 4, 1969  B. A. SHADER  3,425,536
CONVEYOR CHAIN
Original Filed Aug. 3, 1966
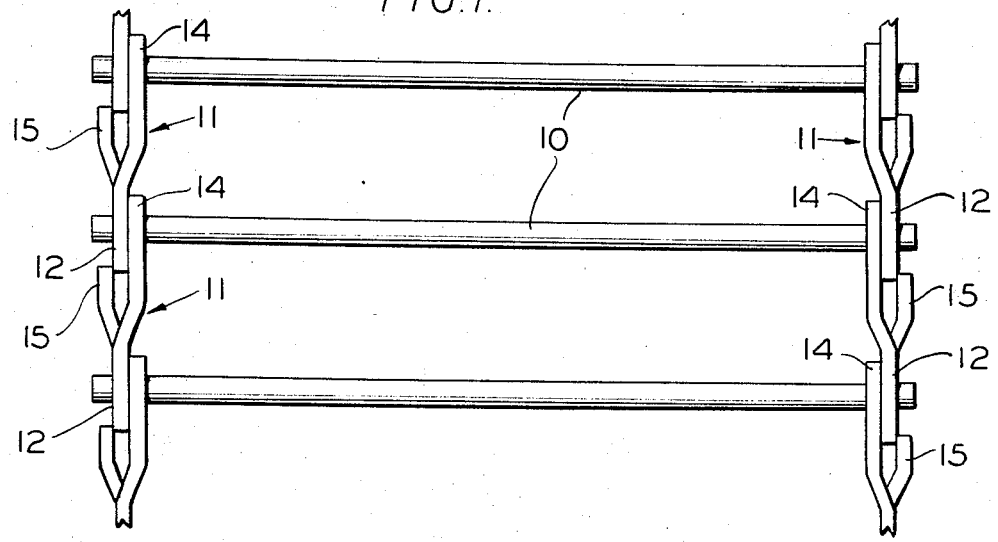
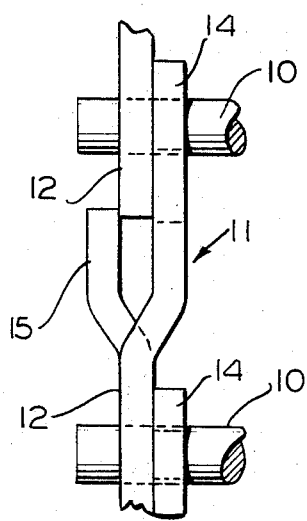
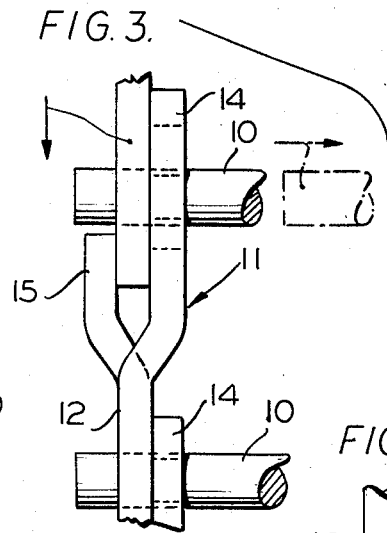
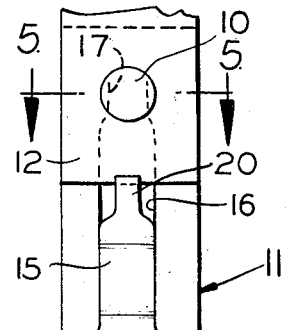
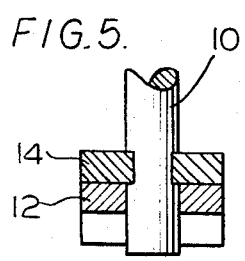
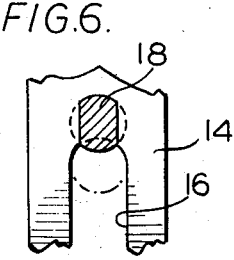
INVENTOR
BENJAMIN A. SHADER
ATT'Y

United States Patent Office 3,425,536
Patented Feb. 4, 1969

3,425,536
CONVEYOR CHAIN
Benjamin A. Shader, Golden, Colo., assignor to International Harvester Company, Chicago, Ill., a corporation of Delaware
Continuation of application Ser. No. 570,057, Aug. 3, 1966. This application Feb. 15, 1968, Ser. No. 705,855
U.S. Cl. 198—189                                4 Claims
Int. Cl. B65g 17/38

ABSTRACT OF THE DISCLOSURE

A relatively wide conveyor chain consists of spaced transverse rods interconnected at their ends by links, each of which has a round opening at one end to receive a round part of a rod and a slot of the key-hole type at its other end. The end of one rod is axially projected into the round opening and the end of the next rod is slipped axially into the round part of the slot, the part of the rod disposed in the round part of a slot having a notched portion whereby the rod can be inserted into the restricted part of the slot.

---

This application is a continuation of S.N. 570,057, filed Aug. 3, 1966, now abandoned.

This invention relates to conveyor chains, and particularly to a novel flight rod and link structure. More specifically, the invention concerns a conveyor of the type utilized in the harvesting of beets, potatoes and the like.

An endless conveyor chain of the type in common use involes spaced parallel flight bars or rods connected at the ends by links in such a way that under the adverse conditions of their use the links were often displaced from the ends of the flight rods and the connections were subject to abnormal wear, resulting in breakage requiring frequent repair. Therefore, the present invention has for its object the provision of an improved conveyor of simple and economical construction wherein minimum wear occurs between flight bars and connecting elements under adverse conditions.

Another object of the invention is the provision of improved conveyor chain means for use in beet and potato harvesting equipment and the like wherein the flight rods and connecting links are flexibly but securely connected in such a way as to accurately position the rods and prevent disconnection of the conveyor elements.

Other objects and advantages of the invention will become clear from the following detailed description when read in conjunction with the accompanying drawings wherein:

FIGURE 1 is a plan view of a portion of a conveyor incorporating the features of this invention:

FIGURE 2 is an enlarged detail of a portion of the structure shown in FIGURE 1;

FIGURE 3 is a view similar to FIGURE 2 illustrating the manner in which the conveyor may be disassembled;

FIGURE 4 is a side elevational view of a portion of the structure shown in FIGURE 1;

FIGURE 5 is a section taken on the line of 5—5 of FIGURE 4;

FIGURE 6 is a sectional view of the portion of the structure shown in FIGURE 5; and FIGURE 7 is a detail showing one end of a flight rod.

FIGURE 1 shows a portion of a conveyor of the endless type comprising a pluarlity of successive flight rods or bars 10, each of which is a substantial duplicate of the other, and side bars or coupling links 11.

Each of the links 11 comprises a base portion 12 apertured to rotatably receive the bearing section 13, one of which is provided at each end of the flight bar or rod.

The other end of link 11 comprises an elongated bar portion 14 offset from the base portion 12, and a relatively short bar portion 15 offset from the base in the opposite direction.

The relatively short portion 15 is fashioned from the relatively long portion 14 by stripping the latter to form an elongated slot 16, and bending outwardly the resulting tang constituting the relatively short bar portion 15.

The base 12 of each link 14 overlaps the elongated bar portion 14 of an adjacent link and an extension of slot 16 is provided terminating in a narrowed or keyhole portion 17. In assembling the conveyor elements rod 10 is axially inserted in the larger section of slot 16 and through the registering opening in base 12 of the adjacent link. Rod 10 is then shifted radially until a deformed portion 18 thereof, formed by transverse notches 19 in the rod adjacent bearing portion 13, is received in the restricted end 17 of slot 16. When the deformed portion 18 is seated in the restricted end 17 of the slot the rod is nonrotatable therein and the rod cannot be displaced by axial movement. The rod is thus accurately positioned with respect to each link and is pivotable with respect to the base portion of the adjacent link.

The tang or relatively short bar portion 15 of each link has an end portion 20 of reduced width which overlaps and engages the outer face of base portion 12 of the adpacent link to retain the latter against displacement axially of rod 10.

Removal of a rod 10 from the assembly is accomplished by shifting the rod in slot 16 out of the restricted portion 17 as indicated in dotted lines in FIGURE 6 and withdrawing it axially.

The construction and operation of the improved conveyor chain construction of this invention should be clearly understood from the foregoing description. It should likewise be understood that the invention has been described in its preferred embodiment and that modifications may be made therein without departing from the spirit of the invention or the scope of the appended claims.

What is claimed is:

1. A conveyor chain assembly including successive transversely extending rods each having a bearing surface at each end and a deformed section adjacent said bearing surface inwardly thereof, overlapping side bars connecting the adjacent ends of succeeding rods, each of said bars having at one end a bearing opening adapted to rotatably receive the bearing surface at the end of one of said rods each of said bars at its other end being in lapping relation to the bearing end of the adjacent bar and disposed inwardly thereof and having a slot therein approximately equal to the diameter of one of said rods to rotatably receive said one of said rods, said slot having a restricted end adapted to slidably an non-rotatably receive the deformed section of said one of said rods, said rods and said bars forming the entire chain assembly, and said chain being disassembled by radially shifting one of the rods out of said restricted end into alignment with the larger diameter portion of the slot.

2. A conveyor chain including successive transversely extending rods each having a cylindrical bearing portion at each end and a notch formed in the rod axially inwardly of said bearing portion, overlapping rigid side bars connecting the adjacent ends of succeeding rods, each of said bars having at one end a cylindrical bearing opening adapted to rotatably receive the cylindrical bearing portion at the end of one of said rods outwardly of the said notch formed therein and having at its other end a relatively long portion disposed axially inwardly of and in lapping relation to the cylindrical bearing portion of the adjacent bar, said relatively long portion of the bar having a slot therein with a cylindrical portion adapted to receive said rod and a restricted portion adapted to slidably and non-rotatably receive the notched portion of said one of said rods, and said bar having a relatively short portion extending outwardly from the main body of the bar in lapping relation to and engageable with the outer face of said adjacent bar.

3. A conveyor chain assembly including successive transversely extending rods each having a cylindrical bearing portion at each end and a notch formed in the rod axially inwardly of said bearing portion, overlapping rigid side bars connecting the adjacent ends of succeeding rods, each of said bars having at one end a cylindrical bearing opening adapted to rotatably receive the cylindrical bearing portion at the end of one of said rods outwardly of the said notch formed therein and having at its other end a portion disposed axially inwardly of and in lapping relation to the cylindrical bearing portion of the adjacent bar, said other end of the bar having a slot therein with a cylindrical portion adapted to receive said rod and a restricted portion adapted to slidably and non-rotatably receive the notched portion of said one of said rods, said conveyor being fashioned solely from said rods and said bars, whereby said chain may be disassembled by shifting each rod radially out of said restricted portion into alignment with the cylindrical portion of said slot and withdrawing the rod.

4. A conveyor chain assembly including successive transversely extending rods each having a cylindrical bearing portion at each end and a notch formed in the rod axially inwardly of said bearing portion, overlapping rigid side bars connecting the adjacent ends of succeeding rods, each of said bars having at one end a cylindrical bearing opening adapted to rotatably receive the cylindrical bearing portion at the end of one of said rods outwardly of the said notch formed therein and having at its other end a relatively long portion disposed axially inwardly of and in lapping relation to the cylindrical bearing portion of the adjacent bar, said other end of the bar having a slot therein with a cylindrical portion adapted to receive said rod and a restrictive portion adapted to slidably and non-rotatably receive the notched portion of said one of said rods, and said bar having a relatively short portion extending outwardly from the main body of the bar in lapping relation to and engageable with the outer face of said adjacent bar, said conveyor being fashioned solely from said rods and said bars, whereby said chain may be disassembled by shifting each rod radially out of said restricted portion into alignment with the cylindrical portion of said slot and withdrawing the rod.

References Cited

UNITED STATES PATENTS

| | | |
|---|---|---|
| 891,189 | 6/1908 | Schmidt. |
| 3,225,901 | 12/1965 | Heinisch. |

EDWARD A. SROKA, *Primary Examiner.*